Figure 5:
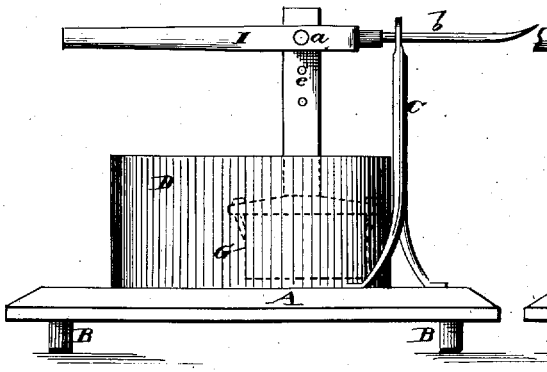

L. CALDWELL.
2 Sheets—Sheet 1.
Assignor to C. A. DODGE.
Washing Machine.
No. 8,134. Reissued March 26, 1878.
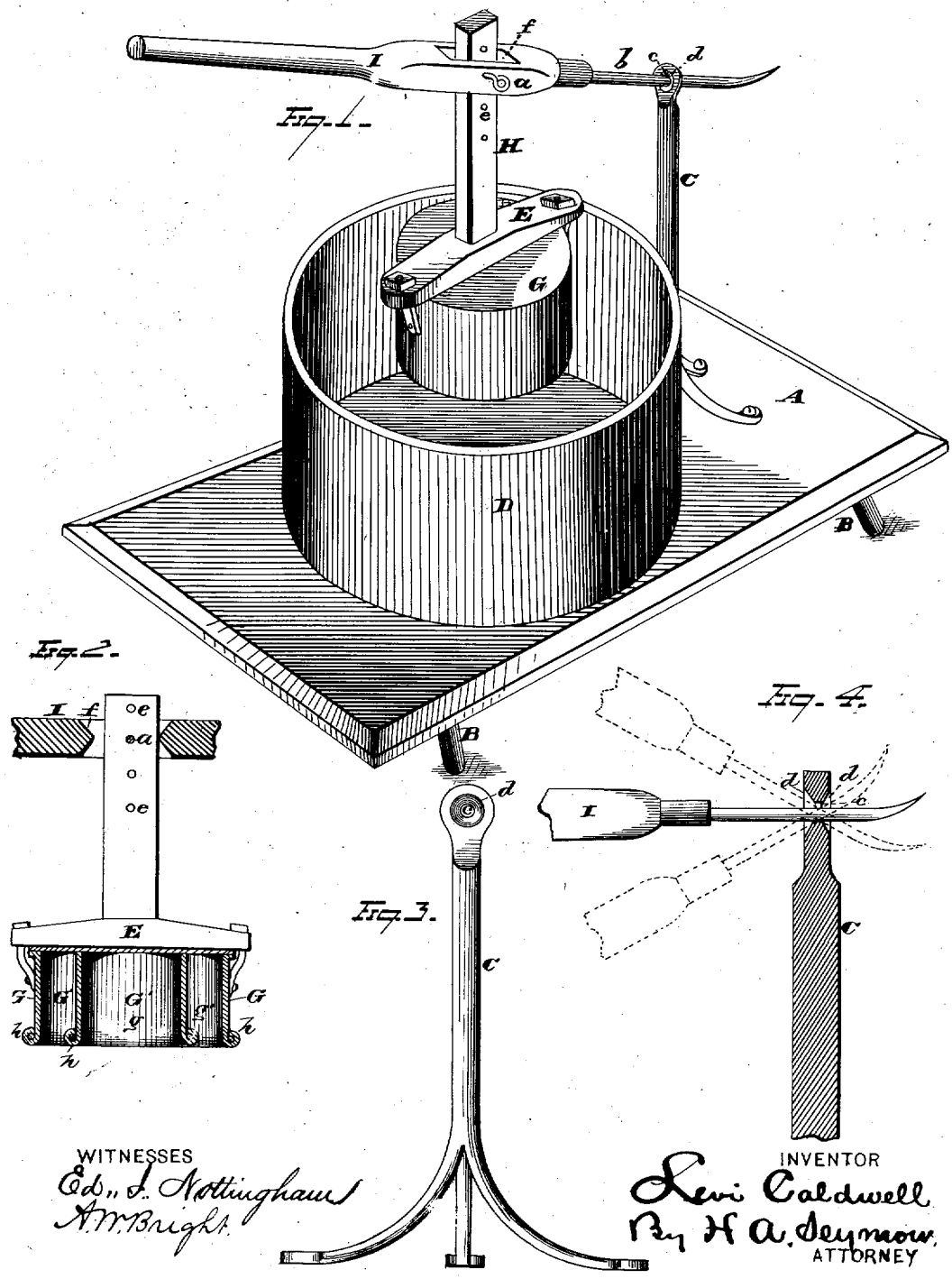
WITNESSES
Ed. J. Nottingham
A. M. Bright
INVENTOR
Levi Caldwell
By H. A. Seymour,
ATTORNEY 2 Sheets—Sheet 2.

L. CALDWELL.

Assignor to C. A. DODGE.

Washing Machine.

No. 8,134. Reissued March 26, 1878.

WITNESSES

Ed. L. Mottinghaus

A. W. Bright.

INVENTOR

Levi Caldwell

By H. A. Seymour.

ATTORNEY.

UNITED STATES PATENT OFFICE.

LEVI CALDWELL, OF BURGETTSTOWN, PENNSYLVANIA, ASSIGNOR TO CYRUS A. DODGE.

IMPROVEMENT IN WASHING-MACHINES.

Specification forming part of Letters Patent No. 131,659, dated September 24, 1872; Reissue No. 8,134, dated March 26, 1878; application filed February 1, 1878.

*To all whom it may concern:*

Be it known that I, LEVI CALDWELL, of Burgettstown, in the county of Washington and State of Pennsylvania, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in pounder washing-machines.

Heretofore, in the so-called "pounder washing-machines," wherein the pounders are attached to and actuated by a lever, the pounders have been made of nearly the same diameter as that of the tub, and the lever arranged and adapted to have only a vertical movement imparted thereto. This class of washing-machines has been found to be objectionable in use, for the reason that they require a large outlay of power to manipulate the large cumbersome pounders, and also from the fact that the pounder failed to properly cleanse the clothes, as it was continuously operated in the same vertical plane, and hence the clothes could not be subjected to the variable action necessary to produce the most effective results.

The object of my invention is to provide a pounder washing-machine of such construction that the pounder may be of any desired size, and although its diameter may be much less than the diameter of the tub, the actuating-lever is constructed and arranged in such a manner that it may have vertical, longitudinal, and lateral movements imparted thereto, whereby the operator is enabled to vary the position of the pounder at will, and place it in any desired portion of the tub. Such a construction of pounder washing-machines allows of the employment of a comparatively small and light pounder, which may be freely operated with a slight expenditure of power, and the entire surface of the clothes in the tub be subjected to the action of the pounder without any stoppage of work on the part of the operator.

My invention consists, first, of a pounder washing-machine having the combination, with a pounder, of an actuating-lever adapted and arranged to have longitudinal, lateral, and vertical movements imparted thereto, whereby the pounder may be readily placed in any part of the tub.

My invention further consists of a pounder washing-machine having the combination, with an actuating-lever adapted to have vertical, lateral, and longitudinal movement imparted thereto, of a pounder and a vertically-adjustable pounder-shaft.

My invention furthor consists in the combination, with an actuating-lever adapted to have vertical, lateral, and longitudinal movements imparted thereto, of a pounder and pounder-shaft, the latter connected with the actuating-lever in such a manner that it may have a rocking movement, and thus allow the shaft to be retained in a vertical position regardless of the position or inclination of the actuating-lever.

Figure 6:
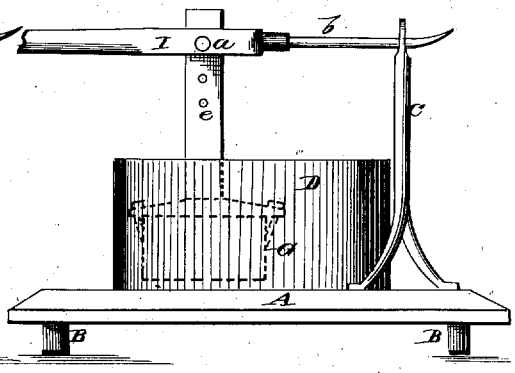
Figure 7:
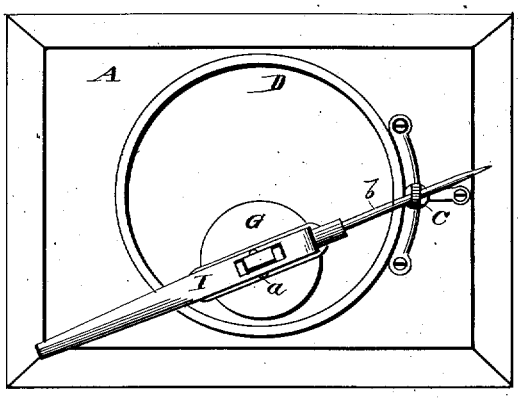

In the accompanying drawings, Figure 1 is a view, in perspective, of my improved pounder washing-machine. Fig. 2 is a vertical section through the pounder, pounder-shaft, and actuating-lever. Fig. 3 is an enlarged view of the standard for receiving the actuating-lever. Fig. 4 is a vertical section of said standard. Fig. 5 is a side elevation of my invention, showing the pounder when it is being operated in close proximity to the standard which supports the actuating-lever. Fig. 6 is a side elevation, illustrating the pounder placed in the tub farthest from the standard. Fig. 7 is a plan view of the machine, showing the pounder placed in one side of the tub.

A represents a bench of any suitable dimensions, supported upon legs B B, and provided at or near one end with an upright post or standard, C, having a hole or eye, *c*, through its upper end. D represents a tub of any desired size, placed on the bench A.

An actuating-lever, I, has secured to one of its ends a rod, *b*, the end of which is pointed and bent to pass through the eye *c* in the post C. Rod *b* has a free longitudinal movement within its fulcrum or eye *c*, in order that the free end of the lever may be moved toward or from the center of the tub.

It will be observed that the upper portion of standard C is flattened or reduced in thickness, and the eye *c* is countersunk on opposite sides of the standard, as shown at *d*. As the eye *c* serves as a fulcrum for the actuating-lever, the opposite surfaces of the standard adjacent to said fulcrum are cut away at *d*, to allow the free or outer end of the actuating-lever to be readily moved either in a vertical line, as illustrated in Fig. 1, or in a lateral direction, as shown in Fig. 7.

H represents the pounder-shaft, having a pounder, G, secured to its lower end by means of a cross-bar, E. Pounder-shaft H is provided with any desired number of holes, *e*, in order that it may be secured in a vertically-adjustable manner within the oblong or rectangular slot *f* in the actuating-lever I by means of a removable pin, *a*.

The oblong or rectangular slot in the actuating-lever permits the pounder-shaft to have a rocking movement therein, whereby said pounder-shaft may retain a vertical position regardless of the position or inclination of the actuating-lever. This construction causes the lower face of the pounder to be maintained in a plane parallel with the bottom of the tub, and hence causes the pounder to strike squarely and firmly on the clothes in the tub, and thereby bring every portion of the lower surface of the pounder in direct contact with its work in any part of the tub at every stroke of the actuating-lever.

The pounder G consists of two inverted cups, G′, which together form the interior space *g* and outer annular space *g′*. The lower edges of cups G′ are turned over, as shown at *h*, in order to afford a smooth surface to the working-face of the pounder and prevent undue wear to the clothes; and, also, such construction serves to add strength to the cups G′ of the pounder.

As the actuating-lever I, carrying the pounder G, is worked up and down in any part of the tub, it causes the pounder to operate on the clothes in the tub, and at every downward stroke of the pounder the air is forced from the interior spaces *g g′* by the water in the tub, thereby forming a partial vacuum within the inverted cups, and thus, when the pounder is raised, the clothes beneath the pounder are drawn up with it until the pounder leaves the water and suds, when air flows into the cups and releases the clothes, which latter fall back into the tub. The position of the clothes in the tub is thus being constantly changed, as the pounder is continuously and successively operated in different parts of the tub, raising a portion of the clothes and allowing them to fall back, and again raising the clothes in another part of the tub.

From the foregoing it will be understood that the operation of my improved pounder washing-machine is not dependent on a pounder of any particular size or construction, as the pounder is readily carried to any portion of the tub, and the actuating-lever is constructed and arranged in such a manner that the clothes in any part of the tub may be subjected to the action of the pounder.

Very little power is required to operate a washing-machine constructed in accordance with my invention. Ample leverage is provided for the manipulation of the pounder, which is comparatively light, and thus rendered easy of operation. The free or outer end of the lever is held by the operator, and by moving the free end of said lever toward or away from the center of the tub in any direction, the pounder may be carried to any portion of the tub without the necessity for releasing the operator's grasp on the lever, and without ceasing the effective strokes of the pounder on the clothes in the tub.

I do not limit myself to any particular construction of pounder or actuating-lever; neither do I restrict myself to the particular construction and arrangement of actuating-lever and fulcrum herein shown and described.

My improvement involves a radical departure in the construction and principle of operation in pounder washing-machines, the invention consisting, broadly, in a pounder washing-machine provided with an actuating-lever and a pounder, the latter adapted and arranged to be moved vertically, laterally, and longitudinally, whereby it may be actuated in any part of the tub.

Having fully described my invention, what I claim as new, and desire to secure by Letters Patent, is—

1. In a pounder washing-machine, the combination, with a pounder-shaft having a pounder secured thereto, of an actuating-lever fulcrumed in such a manner that said lever may be freely moved in a longitudinal, lateral, and vertical direction, and carry the pounder to any part of the tub, substantially as set forth.

2. In a pounder washing-machine, the combination, with a vertically-adjustable pounder-shaft having a pounder secured thereto, of an actuating-lever fulcrumed in such a manner that said lever may be freely moved in a longitudinal, lateral, and vertical direction, and carry the pounder to any part of the tub, substantially as set forth.

3. In a pounder washing-machine, the combination, with a vertically-adjustable pounder-shaft having a pounder secured thereto, of an actuating-lever fulcrumed in such a manner that said lever may be freely moved in a longitudinal, lateral, and vertical direction, the pounder-shaft being pivoted to said lever, whereby said pounder is adapted to have a rocking movement, substantially as set forth.

4. In a pounder washing-machine, the combination, with a pounder-shaft having a pounder consisting of inverted cups or vessels secured thereto, of an actuating-lever fulcrumed in such manner that said lever may be freely moved in a longitudinal, lateral, and vertical direction, and carry the pounder to any part of the tub, substantially as set forth.

In testimony that I claim the foregoing I have hereunto set my hand this 28th day of January, 1878.

LEVI CALDWELL.

Witnesses:
S. P. REDDELE,
THOMAS ACKLESON.